United States Patent [19]

Nealon et al.

[11] Patent Number: 5,300,325
[45] Date of Patent: Apr. 5, 1994

[54] METHOD OF FINISHING A GOLF BALL OR THE LIKE

[75] Inventors: John L. Nealon, Springfield; Thomas J. Kennedy, Chicopee, both of Mass.

[73] Assignee: Lisco, Inc., Tampa, Fla.

[21] Appl. No.: 87,424

[22] Filed: Jul. 2, 1993

[51] Int. Cl.$^5$ .............................................. B05D 3/02
[52] U.S. Cl. .............................. 427/379; 273/235 R; 273/235 A; 427/393.5; 427/412.1
[58] Field of Search ................. 273/235 R, 235 A; 427/379, 393.5, 412.1

[56] References Cited

U.S. PATENT DOCUMENTS

| | | | |
|---|---|---|---|
| 4,126,595 | 11/1978 | Martorano et al. | 428/418 X |
| 4,278,578 | 7/1981 | Carpenter | 428/423.3 X |
| 4,301,053 | 11/1981 | Wolfrey | 428/412 X |
| 4,419,853 | 12/1983 | Failmezger et al. | 52/741 |
| 4,440,847 | 4/1984 | Whittemore, Jr. | 430/416 |
| 4,459,326 | 7/1984 | Colombo et al. | 427/140 |
| 4,563,307 | 1/1986 | Briden | 526/263 X |
| 4,601,862 | 7/1986 | Byrd et al. | 264/3.1 |
| 4,674,751 | 6/1987 | Molitor et al. | 273/235 R |
| 4,679,794 | 7/1987 | Yamada et al. | 273/235 R |
| 4,690,953 | 9/1987 | Orr et al. | 521/65 |
| 4,747,992 | 5/1988 | Sypula et al. | 264/130 |
| 4,802,674 | 2/1989 | Kitaoh | 273/235 A |
| 4,818,600 | 4/1989 | Braun et al. | 428/290 |
| 4,833,173 | 5/1989 | Spek et al. | 521/72 |
| 4,842,950 | 6/1989 | Barton | 428/483 |
| 4,954,559 | 9/1990 | Den Hartog et al. | 524/507 |
| 4,988,762 | 1/1991 | Overbeek et al. | 524/839 |
| 5,000,458 | 3/1991 | Proudfit | 273/235 A |
| 5,002,998 | 3/1991 | Carey et al. | 524/555 |
| 5,029,870 | 7/1991 | Concepcion | 273/235 A |
| 5,057,371 | 10/1991 | Canty et al. | 428/411.1 |
| 5,066,098 | 11/1991 | Kult et al. | 359/540 |
| 5,073,404 | 12/1991 | Huang | 427/164 X |
| 5,091,239 | 2/1992 | Przeworski et al. | 428/195 |
| 5,095,077 | 3/1992 | Gardeski | 525/438 |

OTHER PUBLICATIONS

Kirk-Othmer, Encyclopedia of Chemical Technology, Third Edition, vol. 13, pp. 142-166.
Mobay Corporation, "The Chemistry of Polyurethane Coatings," 1988, pp. 1-16.
Witco Corporation, Organics Division, Witcobond ® W-232 Witcobond W-234, Bulletin 344, Apr. 1986.
BYK ®-Chemie Additives + Instruments SM 30, Data Sheet, BYK ®-346 "Additive for Improving Substrate Wetting in Waterborne Systems".
ICI Resing US, Crosslinker CX-100, "Crosslinker For Air Dry And/Or Low Bake Coatings, " Bulletin CX-100E.

*Primary Examiner*—Michael Lusignan

[57] ABSTRACT

A golf ball or similar game ball is made by providing an ionomer cover and a polyurethane top coat and uniting them with a special primer. First, a cover made of thermoplastic ionomer is provided. The cover is primed with a primer composition consisting essentially of from about 90% by weight to about 96% by weight of a water-borne dispersion of acrylic resin or polyurethane resin or both and from about 4% to about 10% by weight of a polyfunctional aziridine. The primed surface of the cover is coated with a polyurethane top coat. The polyurethane top coat is applied to the primed surface, forming an outer coating or top coat. Finally, the polyurethane top coat is cured while it remains in adherent relation to the primed surface. As a result, the golf ball polyurethane top coat is tightly adhered to the cover of the ball.

3 Claims, No Drawings

METHOD OF FINISHING A GOLF BALL OR THE LIKE

BACKGROUND OF THE INVENTION

The present invention relates to a method for finishing a game ball which has a primer covered by a polyurethane top coat forming the outer surface of the ball. The invention particularly pertains to a method for finishing a golf ball.

A primer is used as an interface between the cover and top coat of a golf ball to improve the adhesion between them. In the past, such primers have included from about 1% to about 3% by weight of a polyfunctional aziridine crosslinker. These proportions of the crosslinker are the crosslinker manufacturer's recommendations to promote adhesion of the primer to substrates. U.S. Pat. No. 4,278,578 ("the '578 patent"), issued to Carpenter, teaches latices containing polyfunctional aziridines. The '578 patent indicates that the use of more than 3% aziridine is not beneficial to coating properties (column 3, lines 21–25).

The present inventors have discovered that the degree of adhesion promoted by the recommended amounts of the polyaziridine cross-linker is not optimal in a primer for adhering the polyurethane top coat to the thermoplastic ionomer resin materials of the type used in golf ball cover compositions.

One complicating factor respecting the use of a primer to join the cover and the polyurethane top coat of a golf ball is that golf balls are intended to be used outdoors under severe conditions at a wide variety of temperatures. Golf balls must be capable of withstanding sunlight and occasional immersion in water traps or puddles, and preferably should be resistant to extended immersion in water, as when they are lost in a water trap, recovered later, and ultimately returned to service. Golf balls are severely jarred, and thus flexed, every time they are hit with a golf club.

Golf balls are not regarded as perishable. They are not stored at a controlled temperature or humidity, and thus can be exposed to wide variations in ambient conditions for a substantial period before they are used, even for the first time. All these conditions require superior adhesion of the polyurethane top coat to the cover of the ball, and yet make it difficult to maintain even adequate adhesion.

OBJECTS OF THE INVENTION

One object of the invention is to provide a primer which improves the adhesion of a polyurethane top coat to a thermoplastic ionomer resin-based composition.

An additional object of the invention is to provide a golf ball which has superior adhesion of its polyurethane top coat to an ionomer cover, both initially and after exposure of the ball to ambient conditions.

One or more of the preceding objects, or one or more other objects which will become plain upon consideration of the present specification, are satisfied by the invention described in this specification.

SUMMARY OF THE INVENTION

The invention is a method of making a golf ball. First, a thermoplastic ionomer covered golf ball is provided. The ionomer is primed with a primer composition consisting essentially of from about 90% by weight to about 96% by weight of a water-borne dispersion of acrylic resin or polyurethane resin or both and from about 4% to about 10% by weight of a polyfunctional aziridine.

The primed surface of the ionomer is coated with a polyurethane top coat. The polyurethane top coat is applied to the primed surface, forming an outer coating. Finally, the polyurethane top coat is cured while it remains in adherent relation to the primed surface. As a result, the polyurethane top coat of the ball is tightly adhered to the cover of the ball.

The resulting ball exhibits superior adhesion of the top coat to the cover, both initially and after outdoor exposure and repeated striking of the ball. This result is surprising because the polyfunctional aziridine crosslinker of the primer composition is used contrary to its recommended use by its supplier, and is used in the environment of potentially interfering crosslinkable resins which are also present in the primer.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

The first step in making a golf ball which is pertinent here is to select the respective materials to be used for its cover, primer, and top coat.

Typical cover materials and compositions include thermoplastic ionomer resins such as those sold under the trademarks Surlyn, available from E.I. DuPont de Nemours and Co., Wilmington, Del.; or Iotek, available from Exxon Chemical Co., Polymers Group, Baytown, Tex.

Next, a primer composition is selected and formulated for uniting the polyurethane top coat (described below) and the cover of the ball. The primer composition consists essentially of from about 90% by weight to about 96% by weight, preferably about 90% by weight, of a water-borne dispersion of a resin selected from the group consisting of acrylic resin, polyurethane resin, and combinations thereof, and from about 4% to about 10% by weight, preferably about 5% by weight, of a polyfunctional aziridine crosslinker material. (As used here, "dispersion" includes colloidal emulsions, latices, and other dispersed forms of the composition.)

The waterborne resin dispersion used in the primer may be an acrylic emulsion or lacquer, for example a material sold by Zeneca Resins Division of Imperial Chemical Industries, PLC, of Wilmington, Del. under the trademark NeoCryl. Particular materials of this type include NeoCryl A-601 and NeoCryl B-723, among others.

The waterborne resin dispersion used in the primer may instead be a polyurethane prepolymer emulsion, for example a material sold by Zeneca, under the trademark NeoRez. A specific NeoRez dispersion useful herein is NeoRez R-960 emulsion. Another material which may be used is WITCOBOND W-234, supplied by Witco, Organics Division, Chicago, Ill.

Combinations of acrylic and polyurethane dispersions are also contemplated within the scope of the present invention. The water-borne dispersions contemplated herein contain from about 5% to about 90% solids, preferably from about 20% to about 40% solids.

One of ordinary skill in the art is readily able to select a resin dispersion which is useful in a primer for the ball cover materials specified above.

The polyfunctional aziridine crosslinker materials useful herein are preferably tri- or more highly functional compounds. The preferred materials include: pentaerythritol-tris-(β-(N-aziridinyl) propionate); trimethylol-propane-tris-(β-(N-aziridinyl)propionate); mixtures of different polyfunctional aziridines identified in U.S. Pat. No. 5,057,371 (for example, from column 3, line 45 to column 5 line 19); the polyaziridine materials identified in U.S. Pat. Nos. 5,091,239 and 4,842,950; and other polyfunctional aziridines. The patents listed in this paragraph are hereby incorporated herein by reference in their entireties to exemplify polyfunctional aziridines. Representative polyfunctional aziridines which are useful herein are sold under the trade designations CX-100; XAMA-2; and XAMA-7 by the manufacturers listed in the patents previously incorporated by reference.

The present primer compositions may include flatting agents, for example, fumed silicas and talcs. Commercially available flatting agents are sold as OK-412 by Degussa Corporation, Teterboro, N.J.; as TS900 by the same company; and as Lo-Vel 27 by PPG Industries Inc., Chemical Group, Pittsburgh, Pa.

The present primer compositions may include small amounts of surfactants where necessary to control orange peel, cratering, and edge pull. Excessive amounts of surfactants may interfere with adhesion of the primer. Examples of surfactants useful herein are sold as FLUORAD FC-120 and FC-129 by 3M Company, St. Paul, Minn.; as EMCOL 4500 by Witco; and as AEROSOL TO-75 by American Cyanamid.

The present primer compositions may include solvents, for example, M-pyrol, sold by GAF Corporation, New York City., N.Y.; Cellosolve solvents sold by Union Carbide Corporation, Coatings Materials Division, New York City, N.Y.; butyl acetate; and propylene glycol.

The primers contemplated herein may contain flow agents, for example BYK 346, sold by BYK-Chemie, U.S.A., Wallingford, Conn.

The present primer compositions may include thickeners, for example, polyacrylic materials, cellulosic materials, and certain solvents which thicken the present compositions. Commercially available materials of this kind are sold as UCAR SCT 100; as QR 1001 by Rohm & Haas; as PARAGUM 147 by Para-Chem Inc., Philadelphia, Penn.; as ACRAMIN Thickener 6 by Verona Dyestuff Division of Mobay Chemical Corporation, Union, N.J.; as ACRYSOL polyacrylates by Rohm & Haas Company; as METHOCEL by Dow Chemical Company, Midland, Mich.; or as NATRASOL by Hercules, Inc., Wilmington, Del.

The present primer compositions can contain defoamers. Commercially available materials of this kind are sold as SWS 211 by SWS Silicones Corporation, Adrian, Mich.; and as BALAB BUBBLE BREAKER 748 or 3056-A by Witco.

One primer composition found herein to be particularly useful is one containing 100 parts of Witcobond W-234, 5 parts of CX-100, 5 parts additional water, and 0.5 parts of BYK 346, each as identified above.

The top coat of the golf ball made according to the present invention may be a polyurethane-based composition. The particular polyurethane composition employed is not critical, as the present primers have been found useful to promote the adhesion of a variety of commonly used polyurethane golf ball top coats. A two-part, solvent-borne polyurethoane is commonly used as the top coat for golf balls.

Part A of the polyurethane is contemplated to be a hydroxy functional polyol with an equivalent weight of from about 100 to about 1500, preferably 200 to 500. Specific hydroxy functional polyols contemplated herein are polyesters, polyethers, or acrylics. Polyols marketed by Mobay Corporation, Coatings Division, Pittsburgh, Penn. under the trademarks DESMOPHEN and MULTRON are particularly contemplated for use herein.

Part B of the polyurethane is contemplated to be an isocyanate or isocyanurate functional polymer with an isocyanate or isocyanurate equivalent weight of 100 to 600. Specific materials of these kinds contemplated for use herein are hexamethylene diisocyanate, methylene diisocyanate, toluene diisocyanate, isophorone diisocyanate, biuret, or trimers of hexamethylene diisocyanate. Isocyanates suitable for use herein are sold by Mobay under the trademark DESMODUR.

The top coat composition necessarily contains a suitable solvent or diluent, may either be transparent or contain pigments, and may also contain modifying binders and extenders.

Exemplary solvents and diluents include esters, ketones, ether esters, aromatic hydrocarbons such as toluene, xylene, or higher-boiling aromatic hydrocarbons. Aliphatic diluents may also be used, depending on the isocyanate selected.

Pigments contemplated for use herein, if any, include titanium dioxide, iron oxides, nickel and chrome titanates, chrome yellow, cadmium types, carbon black, chrome oxide green types, phthalocyanine blue or green, perylene and quinacridone types, and other conventional pigments.

Extenders contemplated for use herein, if any, include barytes, heavy spar, microtalc, kaolin, micaceous iron oxide, magnesium mica, quartz flour, powdered slate, and silicon carbide.

Exemplary modifying binder constituents contemplated here include acetate butyrates, low molecular weight acrylic resins, and polyvinyl chloride/polyvinyl acetate copolymers.

Golf balls having ionomer covers can be finished as follows. The balls are coated with the primer using an air-atomizing sprayer, dried, then cured for 10 minutes at 150 degrees F. (66 degrees C.) in a curing oven. If desired, the legend stamp identifying the ball may be applied to the primer, which helps the legend to adhere to the ball. The top coat is then applied using an air-atomizing sprayer. The primer and top coat are co-cured and crosslinked at 130 degrees F. (54 degrees C.) for six hours. The result is an adherent finish.

The adherence and impact resistance of the finish can be measured by subjecting the ball to repeated impacts or environmental conditions, then evaluating the adhesion of the coating. This can be done by using the balls in field tests to play golf. A more reproducible test can be carried out by using a pneumatic cannon or similar device to propel the balls at 125 feet per second (38 meters per second) against a rigid steel wall at an angle of 45 degrees relative to the wall. This is done 100 times, then the balls are examined for signs of coating failure. In an alternative, more severe test, the balls are placed on outdoor racks exposed to bright sunlight for an extended period before the impact test or field tests are carried out.

Coating failure is evaluated visually after the balls are tested. The lands of the ball (the surface between the dimples) are particularly examined for abrasion by checking to see if they retain the gloss imparted by the top coat. The dimple areas are checked for "pops" where the top coat has separated from the ball. The top coat also commonly flakes off where it has separated from the surface of the ball, so any incidence of flaking is noted.

Golf balls made according to the present invention, in which the primer contains 4.5% CX-100 crosslinker, are compared to balls made in the same manner, except using 3% of the same crosslinker in the primer. The golf balls made with 4.5% CX-100 are surprisingly superior when tested as described above for coating failure.

What is claimed is:

1. A method of making a golf ball comprising the steps of:

A. providing a golf ball having an ionomer cover;

B. priming said ionomer cover with a composition consisting essentially of from about 90% by weight to about 96% by weight of a water-borne dispersion of a resin selected from the group consisting of acrylic resin, polyurethane resin, and combinations thereof, and from about 4% to about 10% by weight of a polyfunctional aziridine, thereby forming a primed surface of said core;

C. applying a polyurethane top coat to said primed surface; and

D. curing said top coat in adherent relation to said primed cover; thereby adhering said golf ball top coat to said primed cover.

2. The method of claim 1, wherein said primer consists essentially of about 4.5% by weight of said polyfunctional aziridine.

3. The method of claim 1, further comprising the step, between said applying and priming steps, of curing said primed surface.

* * * * *